US012441955B2

(12) United States Patent
Alexander et al.

(10) Patent No.: US 12,441,955 B2
(45) Date of Patent: Oct. 14, 2025

(54) SYSTEM AND METHOD FOR TRIGLYCERIDE MANUFACTURE

(71) Applicant: Savor Foods Limited, San Jose, CA (US)

(72) Inventors: Kathleen Alexander, San Jose, CA (US); Ian Salmon McKay, San Jose, CA (US); Nikifar Lazouski, San Jose, CA (US); Evan Roberts, San Jose, CA (US); Trevor Seidel, San Jose, CA (US)

(73) Assignee: Savor Foods Limited, San Jose, CA (US)

( * ) Notice: Subject to any disclaimer, the term of this patent is extended or adjusted under 35 U.S.C. 154(b) by 0 days.

(21) Appl. No.: 18/807,247

(22) Filed: Aug. 16, 2024

(65) Prior Publication Data

US 2025/0059463 A1 Feb. 20, 2025

Related U.S. Application Data

(60) Provisional application No. 63/533,007, filed on Aug. 16, 2023.

(51) Int. Cl.
*C11C 3/02* (2006.01)
*C11C 3/00* (2006.01)
*C11C 3/12* (2006.01)

(52) U.S. Cl.
CPC ................ *C11C 3/02* (2013.01); *C11C 3/006* (2013.01); *C11C 3/12* (2013.01)

(58) Field of Classification Search
CPC .............. C11C 3/02; C11C 3/006; C11C 3/12
See application file for complete search history.

(56) References Cited

U.S. PATENT DOCUMENTS 2,033,732 A 3/1936 Oskar
2,054,096 A * 9/1936 Potts ......................... C11C 1/10
554/177
2,139,589 A 12/1938 Hill
2,319,929 A 5/1943 Hoffman et al.
(Continued)

FOREIGN PATENT DOCUMENTS

WO 2013126990 A1 9/2013
WO 2023076737 A1 5/2023

OTHER PUBLICATIONS

"Additional Informational Concerning the Fischer-Tropsch Process and Its Products, Synthetic Fatty Acids and Detergents", BIOS Final Report No. 1722. Objectives Sub-Committee. B.I.O.S.British Intelligence Objectives Subcommittee (BIOS) Published by British Intelligence Objectives Subcommittee (BIOS). HMSO., London. England, 1947.

(Continued)

*Primary Examiner* — Deborah D Carr
(74) *Attorney, Agent, or Firm* — Jeffrey Schox; Randy Mehlenbacher

(57) ABSTRACT

A method can include receiving an oxygenate sample, fractioning the oxygenate sample into one or more fractions, and separating the fractions (e.g. using FAME fractionation, FAEE fractionation, crystallization, solvent extraction, or other similar methods). The fractions can optionally be separated independently. The method can optionally include esterifying carboxylic acids separated from the fractions with glycerol and deodorizing the glycerides.

18 Claims, 11 Drawing Sheets

(56) References Cited

U.S. PATENT DOCUMENTS

| | | | |
|---|---|---|---|
| 2,831,006 A | 4/1958 | Ernest | |
| 2,835,691 A | 5/1958 | Sauter | |
| 3,413,323 A | 11/1968 | Berry | |
| 3,425,938 A | 2/1969 | Bloomberg et al. | |
| 4,100,181 A | 7/1978 | Phillips et al. | |
| 5,210,242 A | 5/1993 | Asbeck et al. | |
| 5,670,540 A * | 9/1997 | Horrobin ................ | A61P 17/00 514/549 |
| 6,471,844 B1 | 10/2002 | Samuels et al. | |
| 7,560,579 B2 | 7/2009 | Te et al. | |
| 8,648,210 B2 | 2/2014 | Hujanen et al. | |
| 9,745,541 B1 | 8/2017 | Sutterlin et al. | |
| 10,327,452 B2 | 6/2019 | Lao et al. | |
| 11,142,722 B2 | 10/2021 | Malm | |
| 11,542,456 B2 | 1/2023 | Wittenberg et al. | |
| 2005/0043555 A1 | 2/2005 | Garro et al. | |
| 2007/0277430 A1 | 12/2007 | Jackman et al. | |
| 2009/0093648 A1 | 4/2009 | Purtle et al. | |
| 2021/0324301 A1 | 10/2021 | Lorén et al. | |

OTHER PUBLICATIONS

"Additional Informational Concerning the Fischer-Tropsch Process and Its Products, Table of Contents", BIOS Final Report No. 1722, British Intelligence Objectives Subcommittee (BIOS) Published by British Intelligence Objectives Subcommittee (BIOS). HMSO., London. England, 1947.
"Study of Methods for Chemical Synthesis of Edible Fatty Acids and Lipids", NASA Contractor Report, Final Technical Report, National Aeronautics and Space Administration, Washington, D.C., NASA CR-1105, Jul. 1968.
Alexander, Kathleen , et al., "System and Method for Production of Synthetic Fatty Acids", U.S. Appl. No. 17/825,490, filed May 26, 2022.
Anneken, David J., et al., "Fatty Acids", Wiley-VCH Verlag GmbH & Co. KGaA, Weinheim, 2012, vol. 14, pp. 77-116.
Barton, Derek H. R., et al., "The Conversion of Saturated Hydrocarbons into Carboxylic Acids using Fe(CO) 5-H20 2 Oxidation", Tetrahedron Letters, vol. 37, No. 45, pp. 8137-8140, 1996.
Chaux, R. , "Synthetic Soap and Edible Fats", Abstracts of Literature, vol. 54, 1946, p. 308.
Davis, Steven J., et al., "Food without agriculture", Nature Sustainability, https://doi.org/10.1038/s41893-023-01241-2, Published: Nov. 6, 2023.
De Klerk, Arno , "Thermal Cracking of Fischer-Tropsch Waxes", Ind. Eng. Chem. Res. 2007, 46, 5516-5521.
Emanuel, N.M. , "The Oxidation of Hydrocarbons in the Liquid Phase", Book, 1965.
Fineberg, H. , et al., "Synthetic Fatty Acids", J. Am. Oil Chemists' SOC, Nov. 1979 (vol. 56).
García Martínez, Juan B., et al., "Food without agriculture: Food from CO2, biomass and hydrocarbons to secure humanity's food supply against global catastrophe", Trends in Food Science & Technology 150 (2024) 104609.
García Martínez, Juan B., et al., "Synthetic fat from petroleum as a resilient food for global catastrophes: Preliminary techno-economic assessment and technology roadmap", Chemical Engineering Research and Design 177 (2022) 255-272.
Gibon, V. , "Fractionation of lipids for use in food", In the book Modifying lipids for use in food, pp. 201-233, Sep. 2006.
Gilmer, Chad M., "Separation of Saturated Fatty Acids and Fatty Acid Methyl Esters with Epoxy Nanofiltration Membranes", RSC Adv . 2017 ; 7: 55626-55632. doi:10.1039/C7RA11223H.
Krishfield, Laura , "Case Study: Swedish Researchers Identify Fat as the Newest Opportunity for CO2 Derived Ingredients", Lux Research, Nov. 2021.
Layman, Patricia L., "Oleochemicals Fashion Long-Term Optimism from Near-Term Gloom", Oct. 10, 1983 C&EN.
Nooner, D.W. , et al., "Synthesis of Fatty Acids by a Closed System Fischer-Tropsch Process", 1979 American Chemical Society.
Petersen, Anna P., et al., "Cobalt-Based Fischer-Tropsch Synthesis: A kinetic Evaluation of Metal-Support Interactions Using an Inverse Model System", Catalysts 2019, 9, 794.
Raine, T. L. , et al., "The Oxidation of Hydrocarbons, Part I. the Carboxylic Acids Formed in the Slow Oxidation Of n-Heptane", Transactions of the Faraday Society, vol. 47, 1951.
Rushdi, Ahmed I., et al., "Lipid formation by aqueous Fischer-Tropsch-type synthesis over a temperature range of 100 to 4000° C.", Origins of Life and Evolution of Biospheres, Jan. 2001.
Scheidler, Christopher , et al., "Unsaturated C3,5,7,9-Monocarboxylic Acids by Aqueous, One-Pot Carbon Fixation: Possible Relevance for the Origin of Life", Scientific Reports, Mar. 9, 2016.
Tomasek, Szabina , et al., "Hydrocracking of Fischer-Tropsch Paraffin Mixtures over Strong Acid Bifunctional Catalysts to Engine Fuels", ACS Omega 2020, 5, 25413-26420.
Campos, R.J. , et al., "Fractionation of Milk Fat by Short-Path Distillation", J. Dairy Sci. 86:735-745, received Jun. 7, 2002.
Deffense, E. , "Milk Fat Fractionation Today: A Review", American Oil Chemists' Society, vol. 70, No. 12 (Dec. 1993).
Romano, Raffaele , et al., "Triacylglycerols, fatty acids and conjugated linoleic acids in Italian Mozzarella di Bufala Campana cheese", Journal of Food Composition and Analysis 24 (2011) 244-249, Dec. 8, 2010.
Hellstén, et al., "Purification process for recovering hydroxy acids from soda black liquor", Chemical Engineering Research and Design 91 (2013) 2765-2774.
Kharaka, et al., "Thermal decarboxylation of acetic acid: implications for origin of natural gas", Geochimica et Cosmochimica Acta, vol. 47, Issue 3, Mar. 1983, pp. 397-402.

* cited by examiner

| Fraction | Acid | Alkane | Diacid | Alcohol | Lactone | Hydroxy acid |
|---|---|---|---|---|---|---|
| C8/C9 | 92% | 0% | 0% | 1% | 5% | 2% |
| C10/ C11 | 92% | 0% | 0% | 1% | 6% | 1% |
| C12/ C13 | 89% | 2% | 0% | 0% | 7% | 3% |
| C14/ C15 | 76% | 11% | 0% | 0% | 6% | 6% |
| C16/ C17 | 64% | 22% | 3% | 0% | 5% | 5% |
| C18/ C19 | 55% | 27% | 6% | 0% | 6% | 7% |

FIGURE 3A

C8/C9 fraction

| Chain length | Weight % |
|---|---|
| C6 | 1% |
| C7 | 5% |
| C8 | 39% |
| C9 | 53% |
| C10 | 3% |

FIGURE 3B

C16/C17 fraction

| Chain length | Weight % |
|---|---|
| C15 | 2% |
| C16 | 45% |
| C17 | 44% |
| C18 | 9% |
| C19 | 0% |

FIGURE 3C

| Fraction | Acid | Alkane | Diacid | Alcohol | Lactone | Hydroxy acid |
|---|---|---|---|---|---|---|
| C8/C9 | 92% | 0% | 0% | 0% | 5% | 3% |
| C10/ C11 | 90% | 0% | 0% | 0% | 7% | 3% |
| C12/ C13 | 89% | 0% | 0% | 0% | 7% | 4% |
| C14/ C15 | 86% | 0% | 0% | 0% | 7% | 7% |
| C16/ C17 | 85% | 0% | 2% | 0% | 7% | 6% |
| C18/ C19 | 80% | 0% | 7% | 0% | 8% | 6% |

FIGURE 4A

C8/C9 fraction

| Chain length | Weight % |
|---|---|
| C6 | 1% |
| C7 | 6% |
| C8 | 38% |
| C9 | 52% |
| C10 | 3% |

FIGURE 4B

C16/C17 fraction

| Chain length | Weight % |
|---|---|
| C15 | 2% |
| C16 | 45% |
| C17 | 44% |
| C18 | 9% |
| C19 | 0% |

FIGURE 4C

| | C8/C9 triglycerides | | C16/C17 triglycerides | | C8/C9 & C16/C17 triglycerides | |
|---|---|---|---|---|---|---|
| | Saponification | Saponification and solvent extraction | Saponification | Saponification and solvent extraction | Saponification | Saponification and solvent extraction |
| Steam rate (kg/ hr) | 1 | 0.6 | 875 | 335 | 3500 | 1340 |
| Feed rate (kg/hr) | 500 | 500 | 1530 | 1160 | 2030 | 1540 |
| Glyceride recovery (%) | 99% | 99% | 99.50% | 99.40% | 98.70% | 98.70% |
| Impurities (wt%) | 1 | 1% | 1% | 1% | 1% | 1% |

FIGURE 5

SYSTEM AND METHOD FOR TRIGLYCERIDE MANUFACTURE

CROSS-REFERENCE TO RELATED APPLICATIONS

This application claims the benefit of U.S. Provisional Application No. 63/533,007 filed 16 Aug. 2023, which is incorporated in its entirety by this reference.

TECHNICAL FIELD

This invention relates generally to the fatty acid field, and more specifically to a new and useful system and method in the fatty acid field.

BRIEF DESCRIPTION OF THE FIGURES

FIGS. 3A, 3B, and 3C are exemplary tables of exemplary sample compositions after a saponification separation and fractionation.

FIGS. 4A, 4B, and 4C are exemplary tables of exemplary sample compositions after a saponification and solvent extraction separation and fractionation.

FIG. 5 is a table showing exemplary deodorization conditions for esterified fractions and interesterified fractions.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
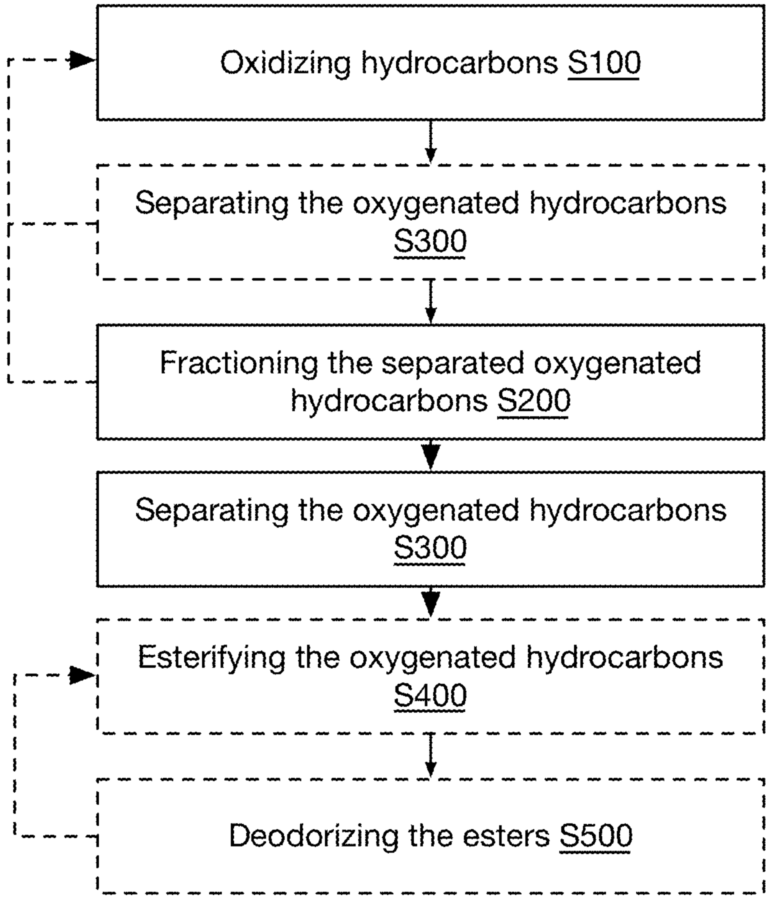
FIG. 1 is a schematic representation of the method.

As shown in FIG. 1, the method can include oxidizing hydrocarbons S100, separating the oxygenated hydrocarbons S300, and fractioning the oxygenated hydrocarbons S200. The method can optionally include esterifying the separated oxygenated hydrocarbons S400, deodorizing the esters S500, and/or any suitable step(s).

The method preferably functions to make (e.g., synthesize, manufacture, produce, etc.) a glyceride (e.g., triglyceride, 1- or 2-monoglyceride, 1,2- or 1,3-diglyceride, etc.) composition which can be used, for example, as a substitute or artificial fat in food products, a baking or cooking oil (e.g., frying oil), a soap, a lubricant, a surfactant, detergent, emulsifier, texturizing agent, wetting agent, anti-foaming agent, stabilizing agent, emollient, metal working fluid, water treatment, varnish or other surface treatment, in personal care or cosmetic products (e.g., in lip balm, lotion, etc.), and/or can be used for any suitable purpose (e.g., to be used as a fatty acid or to form a formulation as disclosed in U.S. patent application Ser. No. 18/210,207 titled 'FAT FORMULATIONS' filed 15 Jun. 2023 or U.S. patent application Ser. No. 18/428,575 titled 'MILKFAT OR BUTTERFAT FORMULATIONS' filed 31 Jan. 2024, each of which is incorporated in its entirety by this reference). The method can additionally or alternatively function to make free fatty acid(s) and/or any suitable composition. The fatty acids (e.g., making up the glyceride(s)) are preferably saturated, but can be unsaturated, aromatic, cyclic and/or have any suitable structure. The fatty acids are preferably straight chain (e.g., unbranched), but can be branched and/or have any suitable structure. The glycerides can be chiral and/or achiral.

2. Benefits

Variations of the technology can confer several benefits and/or advantages.

First, the inventors have discovered that methods for forming glyceride compositions with wide ranges and/or gapped (e.g., multimodal, polymodal, having nonmonotonicity in carbon chain length distribution, etc.) formulations (e.g., a formulation that includes two or more fatty acids with nonconsecutive carbon chain lengths, formulations with one or more fatty acid chain length excluded from the formulation, etc.) of fatty acids can require more energy and/or greater amounts of reactants (e.g., the amount of reactants is not additive when using a broader formulation) to remove impurities and/or otherwise purify or clean the glycerides. For instance (as shown for example in FIG. 5) a steam rate necessary to purify a triglyceride sample that includes a mixture of C8/C9 and C16/C17 triglycerides can be approximately 4× greater than the steam rate necessary to purify the C8/C9 triglycerides and C16/C17 triglycerides separately. The inventors have found that using additional separation processes, performing intermediate purification and/or deodorization steps (e.g., a timing of purification steps), and/or other process modifications can, in some variants, decrease the steam rate needed for the purification of the triglycerides (e.g., while maintaining a carbon impact less than a threshold carbon impact, while maintaining an energy requirement less than a threshold energy, etc.).

Second, variants of the technology can be beneficial for producing fatty acids (and/or derivatives thereof) with a low carbon intensity (e.g., without the use of agriculture). For example, by using inorganic carbon feedstocks (e.g., carbon dioxide, carbon monoxide, methane, ethane, ethene, ethyne, coal, etc.), fatty acids can be manufactured without requiring animals, plants, or other living organisms. This can lead to lower land-use, less water use, enhanced energy efficiency, and/or can otherwise facilitate a low carbon intensity (e.g., small carbon footprint).

Third, variants of the technology can enable economical production of fatty acids (e.g., while maintaining or achieving a low carbon intensity, without the use of agriculture, etc.).

Fourth, variants of the technology can decrease the quantity of oxygenated species, particularly (but not exclusively) those that can impart undesirable gustatory, olfactory, organoleptic and/or other properties to a formulation (e.g., for a food product) using fatty acids and/or glycerides derived therefrom. For instance, the use of a formic acid wash can be beneficial for separating (e.g., removing) dicarboxylic acids from the free fatty acids (e.g., monocarboxylic acids).

In another specific example, heat treatment (e.g., of FAE materials, of free fatty acids, etc.) can be used to separate (e.g., degrade, remove, etc.) non-carboxylic acid species (e.g., lactones, hydroxyacids, ketoacids, etc.) from the free fatty acids (and/or carboxylates derived therefrom). However, any suitable processes can be used to separate or remove oxygenated species.

Fifth, the inventors have discovered that by performing separations (e.g., orthogonal or partially orthogonal such as leveraging a different physical and/or chemical property of the species and/or a shifted physical and/or chemical property of the species) after fractioning the oxygenated hydrocarbons into narrow chain length distributions (e.g., including substantially a single carbon chain length, substantially two carbon chain lengths, substantially three carbon chain lengths, substantially four carbon chain lengths) undesirable species can be better separated from (e.g., higher purities can be achieved, higher yields, etc. of carboxylic acids) the fractionated oxygenated hydrocarbons (as opposed to performing the separations prior to fractionation).

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

4. Method

As shown in FIG. 1, the method can include oxidizing hydrocarbons S100, separating the oxygenated hydrocarbons S300, and fractioning the oxygenated hydrocarbons S200. The method can optionally include esterifying the separated oxygenated hydrocarbons S400, deodorizing the esters S500, and/or any suitable step(s).

The method can be performed in a single-pot synthesis or a multi-pot synthesis. The method can be performed at a laboratory scale (e.g., ranging from producing and/or consuming masses of products or reactants between about 1 ng and 1 g), process scale (e.g., 1 g to 1 kg), bench scale (e.g., 1 kg to 100 kg), demonstration scale (e.g., greater than 100 kg), and/or on any suitable scale. The method (and/or steps thereof) can be performed in a batch reactor, continuous stirred-tank reactor, plug flow reactor, semi-batch reactor, catalytic reactor, and/or in any suitable tank, manifold (e.g., pipe, tube, etc.), and/or chemical reactor. The method and/or steps thereof can be performed in a batch process, a continuous process, and/or in any suitable process.

Oxidizing the hydrocarbon sample S100 functions to form oxygenated hydrocarbons. The oxygenated hydrocarbons are preferably monocarboxylic acids but can additionally or alternatively include other oxygenated (by) products such as: alcohols, ketones, aldehydes, polycarboxylic acids (e.g., diacids), cyclic esters (e.g., lactones), oxoacids (e.g., ketoacids), hydroxyacids (e.g., including a hydroxyl moiety and a carboxylic acid moiety), acid anhydrides, ethers, and/or any suitable species. The hydrocarbon sample can be oxidized in the same or a different reactor from a reactor used for the formation of the hydrocarbon sample.

The hydrocarbon sample to be oxidized can include hydrocarbons (e.g., mined hydrocarbons, recovered hydrocarbons, hydrocarbons formed from a Fischer-Tropsch synthesis, etc.), oxygenated hydrocarbons (e.g., from a Ziegler process, from prior instances of oxidizing hydrocarbons, etc.), processed hydrocarbons, synthesized hydrocarbons, received hydrocarbons (e.g., natural gas, coal gas, town gas, shale gas, clathrates, etc.), and/or any suitable species. In some variants, the hydrocarbon sample can include up to 100% (e.g., 10%, 20%, 30%, 40%, 50%, 60%, 70%, 80%, 90%, values or ranges therebetween, etc.) recycled hydrocarbons (e.g., hydrocarbons or oxygenated hydrocarbons from previous oxidation processes). For example, a straight-chain paraffin sample (e.g., a sample that includes essentially only straight chain hydrocarbons) can be oxidized. In another example, a mixture of essentially only straight-chain paraffins and straight-chain oxygenated hydrocarbons (e.g., recycled hydrocarbons) can be oxidized). However, in some variants, the hydrocarbon sample can include branching hydrocarbons, unsaturated (e.g., cyclic, aromatic, alkene, alkyne, etc.) hydrocarbons, and/or other suitable organic materials (e.g., where these species are subsequently removed from the hydrocarbons or oxygenated hydrocarbons in S200, S300, and/or S500).

The hydrocarbon sample preferably includes hydrocarbons with a chain length between about 6 and 100 carbon atoms. However, the hydrocarbon sample can additionally or alternatively include hydrocarbons with a chain length shorter than 6 carbon atoms and/or longer than 100 carbon atoms. In some variants, the hydrocarbon sample can include oxygenates (particularly recycled oxygenates with oxidation states below carboxylic acids such as alcohols, ketones, aldehydes, epoxides, ethers, etc.). In these variants, the hydrocarbon sample is typically at most about 30% oxygenate (e.g., by mass). However, the hydrocarbon sample could be up to 100% oxygenates.

In an illustrative example, the hydrocarbon sample can include hydrocarbons with chain lengths between about 18 and 28 (e.g., a peak of a chain length distribution of the hydrocarbons can be between 18 and 28 carbon atoms, at least 90% of the hydrocarbon sample can be hydrocarbons with a chain length between 18 and 28 carbon atoms, etc.).

In some variations, oxidizing the hydrocarbon sample can additionally or alternatively function to modify (e.g., decrease) a distribution of chain lengths of the hydrocarbon sample (e.g., decrease an average chain length, decrease a most common chain length, etc.) and/or can otherwise function. In these variations, the oxidation process can broaden the chain length distribution (e.g., produce a larger range of chain sizes in the oxygenated hydrocarbons than in the hydrocarbon sample, increase a standard deviation, etc.) and/or not change the chain length distribution deviation. For example, after the oxidation reaction, the oxidized hydrocarbons can include oxygenated hydrocarbons with between about 2 and 24 carbon atoms. However, the oxygenated hydrocarbons can include any suitable number of carbon atoms. Additionally or alternatively, the oxidation reaction can crack the hydrocarbons. However, cracking the hydrocarbons can optionally (e.g., in variants that include a cracking step) be performed as a separate process (e.g., before or after oxidizing the hydrocarbon).

However, any suitable hydrocarbon sample can be oxidized.

The oxidation reaction is preferably performed substoichiometrically, which can be beneficial for avoiding the production of overoxidized species (e.g., ketoacids, oxoacids, hydroxyacids, peroxides, peroxyacid, polyacids, etc. when the target species are monocarboxylic acids). For instance, the reaction can be performed in reaction conditions (e.g., oxidizing agent concentration or partial pressure, catalyst, temperature, reaction time, etc.) to achieve oxidation of between about 20 and 50% of the hydrocarbon sample (e.g., by mass, by volume, by moles, etc.), where the remainder of the sample is not oxidized.

However, the oxidation reaction can be performed to completion (e.g., up to 100% of the hydrocarbon sample can be oxidized, greater than 100% of the hydrocarbon sample can be oxidized when the reaction conditions result in cleavage of long chain hydrocarbons and each resulting hydrocarbon is oxidized, etc.) and/or can otherwise be performed.

For instance, the oxidation conditions used in S100 are preferably selected to form alcohols (e.g., primary alcohols, monohydric alcohols, etc.), aldehydes (e.g., monoaldehydes), monocarboxylic acids, and/or other oxygenated species where a single carbon atom in the chain (e.g., preferably but not necessarily a primary or terminal carbon atom) is bonded to an oxygen atom. Similarly, the conditions are preferably selected to avoid formation of polyhydric alcohols, ketones, polycarboxylic acids, lactones, and/or other oxygenated species where a plurality of carbon atoms are bonded to oxygen and/or a secondary (or higher order) carbon atom is bonded to an oxygen atom.

Unreacted hydrocarbons are preferably recycled (e.g., have S100 performed on them again, be mixed with a second hydrocarbon sample that is to be oxidized, gasified, etc.). However, unreacted hydrocarbons can be discarded, and/or can otherwise be used. Similarly, underoxidized species (e.g., aldehydes, alcohols, ethers, etc.) can be recycled in the oxidation reaction, can be reduced (e.g., via gasification to form carbon feedstock), and/or can otherwise be recycled and/or used. Overoxidized species (e.g., ketones, polyhydric alcohols, secondary alcohols, tertiary alcohols, lactones, etc.) can be reduced (e.g., via hydrogenation) where the reduced species can be oxidized again, can be gasified (e.g., to form carbon feedstock), and/or can otherwise be used.

Examples of process parameters that can be tuned to modify the resulting oxygenated hydrocarbon composition in some variants of S100 can include: oxidation time, oxidation temperature, oxidation catalyst, oxidation flow rate, oxygen concentration, oxidation pressure, mixing rate, and/or any suitable process parameters can be used.

The hydrocarbon sample is preferably oxidized at a temperature between about 90-500° C. (e.g., 90-150° C.), but can be performed at a temperature less than 90° C. or greater than 500° C. The hydrocarbon sample is preferably oxidized at a pressure between about 1 and 25 bar. The hydrocarbon sample can be oxidized using air, oxygen (e.g., pure oxygen such as oxygen with a purity of 90%, 95%, 97%, 98%, 99%, 99.5%, 99.9%, 99.95%, 99.99%, 99.995%, 99.999%, 99.9999%, 100%, etc.), ozone, hydrogen peroxide, superoxide (e.g., sodium superoxide, potassium superoxide, rubidium superoxide, cesium superoxide, etc.), nitric oxide, potassium permanganate, and/or any suitable oxidizing agent. The flow rate (e.g., of the oxygen component of the oxidant, of air, etc.) is preferably between 2 sccm/100 gram hydrocarbon and 1000 sccm/20 gram hydrocarbon (e.g., 5 sccm/100 gram hydrocarbon, 2 sccm/50 gram hydrocarbon, 5 sccm/50 gram hydrocarbon, 2 sccm/20 gram hydrocarbon, 5 sccm/20 gram hydrocarbon, 10 sccm/20 gram hydrocarbon, 20 sccm/20 gram hydrocarbon, 40 sccm/20 gram hydrocarbon, 50 sccm/20 gram hydrocarbon, 100 sccm/20 gram hydrocarbon, 200 sccm/20 gram hydrocarbon, 400 sccm/20 gram hydrocarbon, 500 sccm/20 gram hydrocarbon, 1000 sccm/20 gram hydrocarbon, values or ranges therebetween, etc.). The hydrocarbon sample can be maintained in the oxidation conditions for between 1 minutes and 240 hours. However, the hydrocarbon sample oxidized using any suitable conditions.

The hydrocarbon sample can be oxidized in the presence of a catalyst and/or oxidized without using a catalyst. The catalyst can be heterogeneous or homogeneous. Exemplary catalysts include: permanganate (e.g., potassium permanganate), iron catalyst (e.g., iron trispicolinate, iron pentacarbonyl, (cyclopentadienone) iron carbonyl, etc.), manganese-based catalyst, iron-based catalyst, cobalt-based catalyst, phenacylamine catalyst, soluble catalyst (e.g., manganese soaps such as manganese laurate), phosphorous catalysts (e.g., trimethyl phosphite), combinations thereof, and/or using any suitable catalyst (e.g., other transition metal catalysts with or without support materials).

Fractioning the oxygenated hydrocarbons S200 functions to separate oxygenated hydrocarbons into fractions of oxygenate species where each fraction includes (e.g., consists of, is composed of, consists essentially of, is composed essentially of, etc.) oxygenate species of a different chain length from other fractions (e.g., a sample with C8-C17 oxygenates could be fractioned into a C8/C9 fraction, a C10/C11 fraction, a C12/C13 fraction, a C14/C15 fraction, and a C16/C17 fraction but other fractions could be formed or used). Fractioning the oxygenated hydrocarbons can additionally or alternatively function to improve a separation of the carboxylic acids (e.g., remove non-monocarboxylic oxygenated hydrocarbon species in the carboxylic acid sample prepared in S300) and/or can otherwise function.

The oxygenated hydrocarbons can be fractionated using fractional distillation (e.g., short path distillation), using solvents (e.g., supercritical fluid fractionation, solvent fractionation such as using a solvent or solvent combination from solvents as described above, etc.), crystallization (e.g., static crystallization), using an evaporation process (e.g., falling-film evaporation, wiped film evaporation, etc.), winterization, using one or more separation technique (e.g., as described in S300), and/or in any manner.

The oxygenated hydrocarbons are preferably fractioned into narrow band fractions (e.g., predominantly a single chain length, predominantly 2 chain lengths such as an even chain length and an odd chain length immediately larger than the even chain length, etc.), but can be fractioned into broad band fractions (e.g., fractions that include greater than 3 chain lengths), into nonsequential fractions (e.g., separate even chain length fractions, odd chain length fractions, etc.), and/or can be separated into any suitable fractions. As an illustrative example, a oxygenated hydrocarbons sample can be fractioned into a short chain (e.g., shorter than 8 carbon atoms) fraction, a C8 and C9 fraction, a C10 and C11 fraction, a C12 and C13 fraction, a C14 and C15 fraction, a C16 and C17 fraction, a C18 and C19 fraction, a C20 and C21 fraction, a C22 and C23 fraction, and/or a long chain fraction (e.g., longer than 23 carbon atoms in the chain), where C#refers to a number of carbon atoms in the oxygenated hydrocarbons. However, an oxygenated hydrocarbons sample can be fractioned into any suitable samples.

A composition of a fraction is preferably at least about 90% (e.g., by weight, by volume, stoichiometric percent, etc. such as 85%, 87%, 90%, 92%, 95%, 97.5%, 98%, 99%, 99.5%, 99.9%, 99.99%, 99.995%, 99.999%, 99.9999%, etc.) oxygenated hydrocarbons with target chain lengths, but can include less than 90% of the target oxygenated hydrocarbons. In some variations, the nonmonocarboxylic acids within a fraction can have a different carbon chain length than the carboxylic acids in the fraction (where in these variations, the fractions are typically referred to by the chain length of the monocarboxylic acids but could be referred to as narrow or on the basis of a chain length of specific products, carbon length distribution across all oxygenated species, etc.). In a first illustrative example, as shown for instance in FIG. 3B, a C8/C9 fraction (e.g., the carboxylic acid portion thereof) can include 1% C6, 5% C7, 39% C8, 53% C9, and 3% C10. In a second illustrative example, as shown for instance in FIG. 4B, a C8/C9 fraction (e.g., the carboxylic acid portion thereof) can include 1% C6, 6% C7, 38% C8, 52% C9, and 3% C10. In a third illustrative example, as shown for instance in FIG. 3C, a C16/C17 fraction (e.g., the carboxylic acid portion thereof) can include 2% C15, 45% C16, 44% C17, 9% C18, and 0% C19. In a fourth illustrative example, as shown for instance in FIG. 4C, a C16/C17 fraction (e.g., the carboxylic acid portion thereof) can include 2% C15, 45% C16, 44% C17, 9% C18, and 0% C19.

Figure 2:
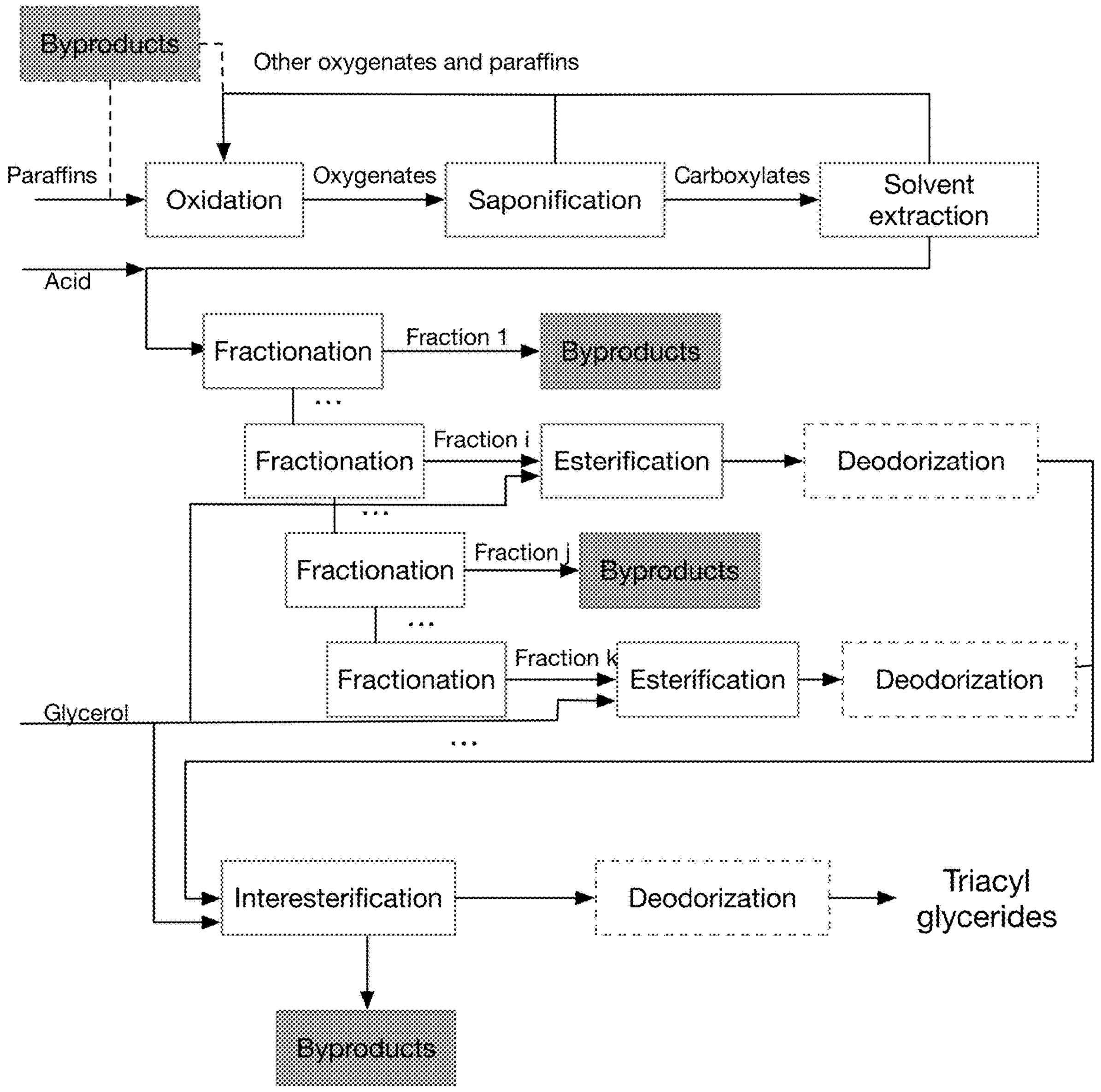
FIG. 2 is a schematic representation of a variant of the method.

Separating the oxidized hydrocarbons S300 can function to separate byproducts or other undesirable species (e.g., partially oxidized hydrocarbons, overoxidized hydrocarbons, etc.) from the oxidized hydrocarbons (e.g., oxygenated hydrocarbons). For example (e.g., as shown for instance in FIG. 2), carboxylic acids (e.g., fatty acids) can be separated from unoxidized hydrocarbons (e.g., paraffins) and/or other oxygenated hydrocarbons (e.g., alcohols, aldehydes, ketones, lactones, polycarboxylic acids, esters, etc.) which can be beneficial for recycling species (e.g., to improve an overall yield), to isolate fatty acids, and/or can otherwise be beneficial. After S300, the oxygenated hydrocarbons are preferably predominantly (e.g., essentially, consist of, consist essentially of, etc.) carboxylic acids (e.g., >90% carboxylic acids, >95% carboxylic acid, >97% carboxylic acid, >99% carboxylic acid, etc.).

Figure 8:
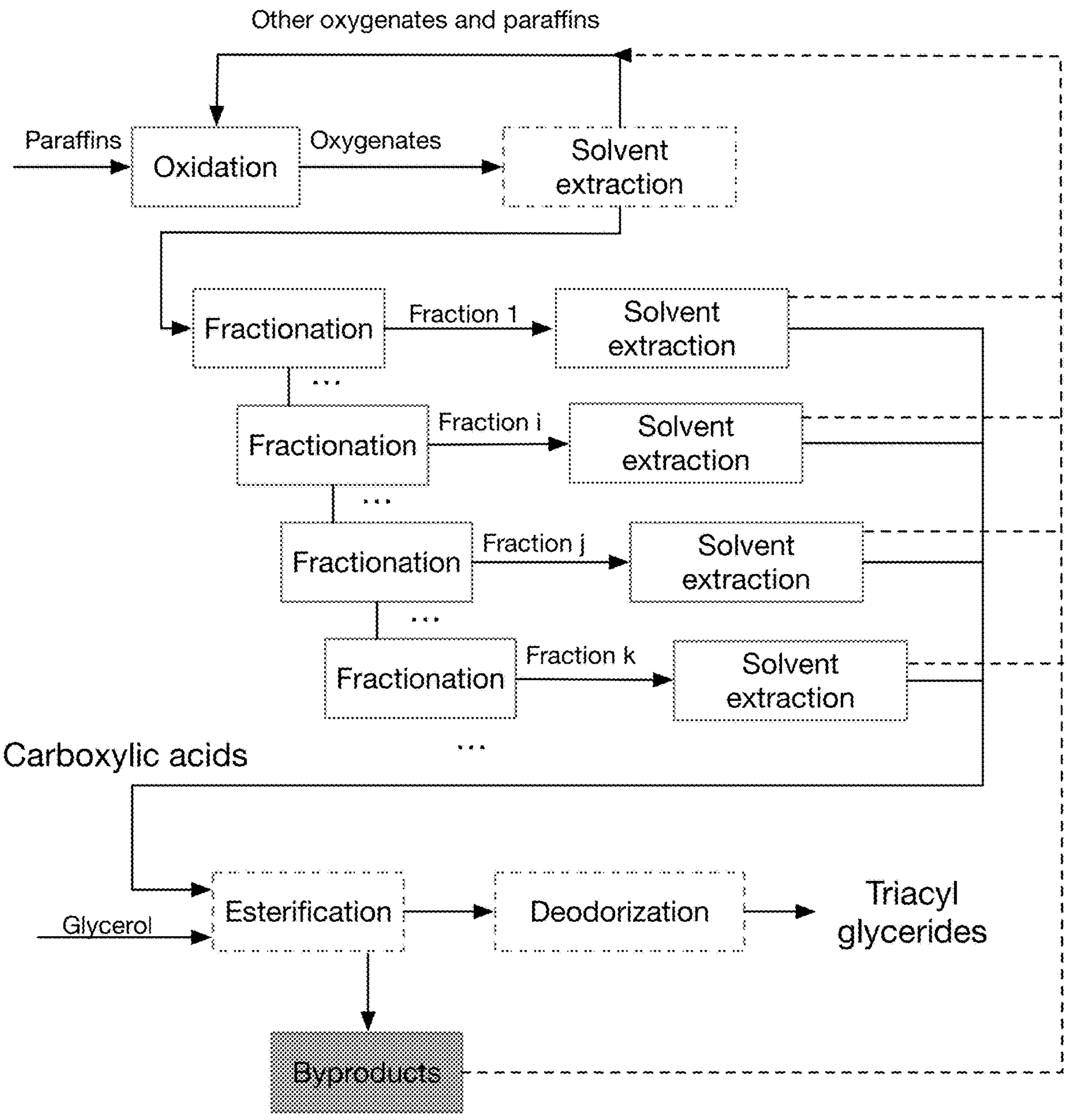
FIG. 8 is a schematic representation of a variant of the method.
Figure 9:
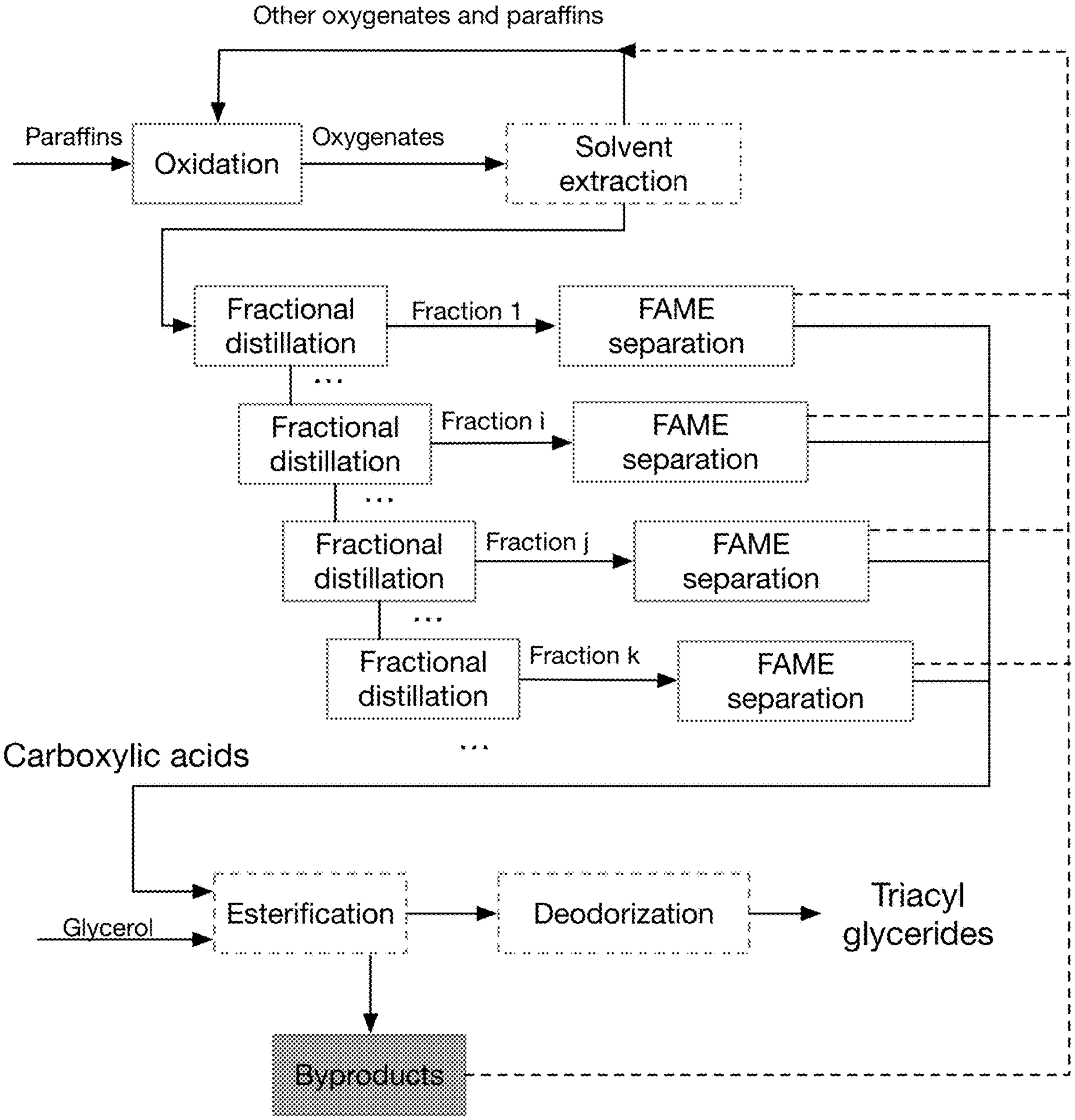
FIG. 9 is a schematic representation of a variant of the method.
Figure 10:
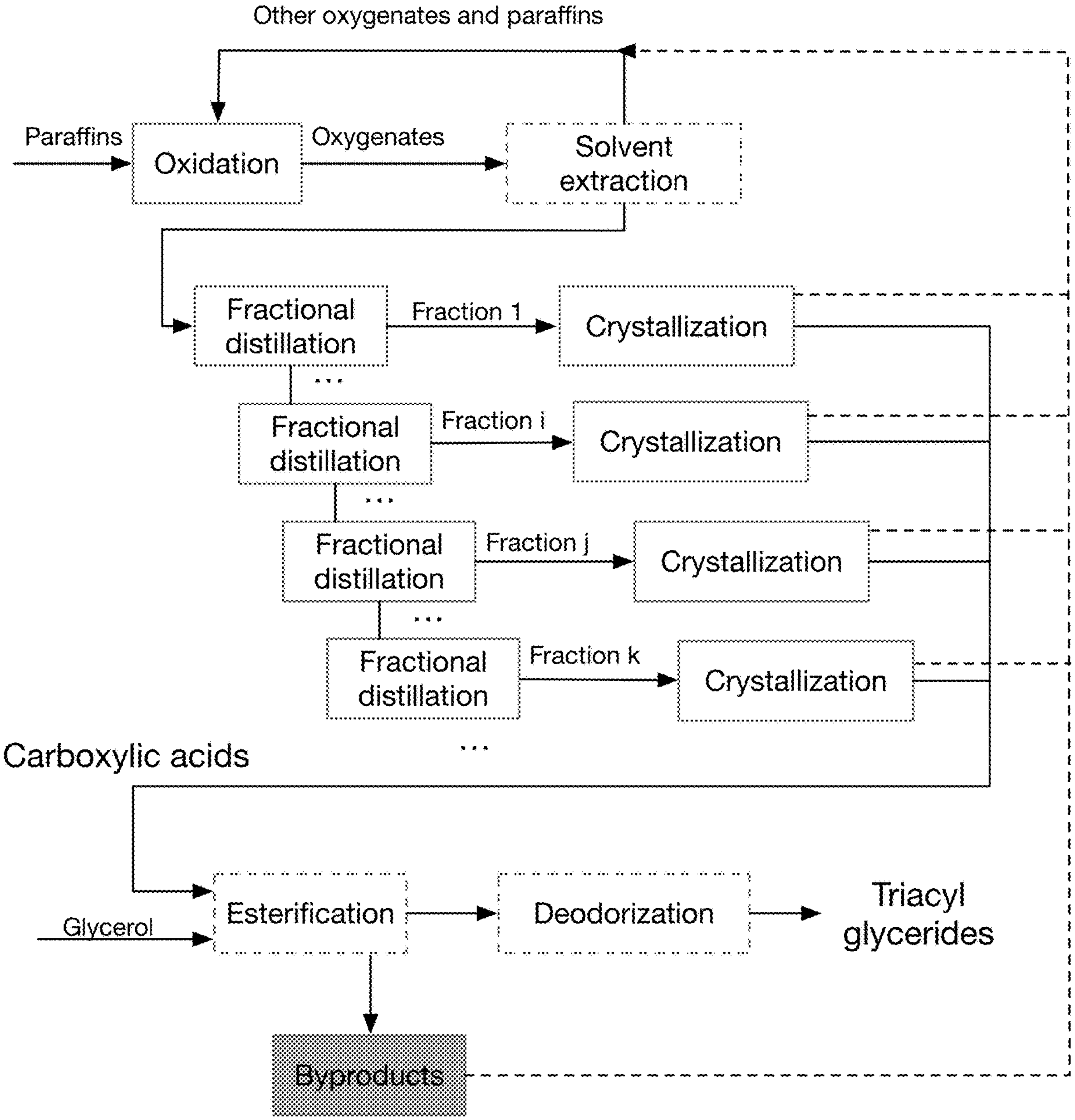
FIG. 10 is a schematic representation of a variant of the method.
Figure 11:
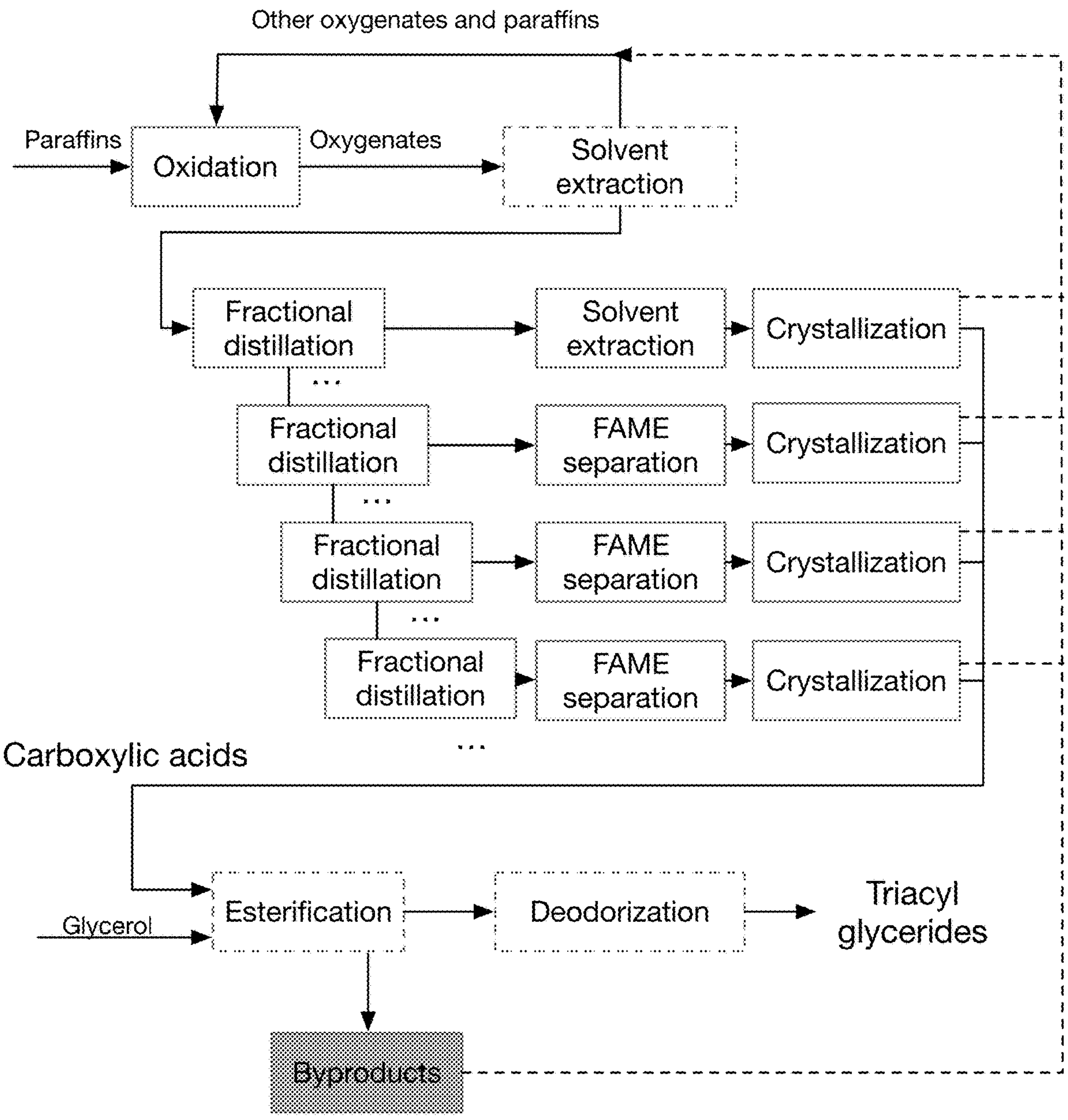
FIG. 11 is a schematic representation of a variant of the method.

S300 is preferably performed after S200, which can be beneficial as separations on individual fractions can be more efficient (e.g., result in a higher yield, result in a higher purity, etc.) than separations performed on the full distribution of oxygenated hydrocarbons. However, S300 can be performed contemporaneously with S200, before S200, and/or with any suitable timing. Each fraction (e.g., from S200) can undergo a different separation (as shown for example in FIG. 11) and/or each fraction can undergo the same separation process (as shown for example in FIG. 8, FIG. 9, or FIG. 10). Each fraction is typically separated independently (as shown for example in FIG. 8, FIG. 9, FIG. 10, or FIG. 11), which can be beneficial as impurities in one fraction can have overlapping properties (and therefore not be readily separated). However, one or more (up to and inclusive of all) fractions can be combined and the combination can undergo the separation. In some variants, only a subset of fractions undergoes a separation (e.g., a shortest fraction or longest fraction can not undergo further separations whereas other fractions undergo further separations).

S300 can leverage physical properties (e.g., boiling point, melting point, solubility, crystal structure, size, polarity, polarizability, electric charge, etc.), chemical properties (e.g., reactivity with one or more chemical species, reactivity under specific thermal conditions, etc.), and/or any suitable properties.

In some variants, S300 can include using a plurality of separation techniques which can function to improve the separation of carboxylic acids from other species. Each of the plurality of separation techniques preferably leverage orthogonal or nearly orthogonal separations vectors. Relatedly, S300 preferably leverages a separation mechanism orthogonal or nearly-orthogonal (e.g., leveraging a similar mechanism but on different species) to the fractionation process (e.g., from S200). As a first specific example, oxygenated hydrocarbons can be separated based on their boiling point and then can be separated based on the boiling point of esters derived from the species remaining therein. As a second specific example, the oxygenated hydrocarbons can be separated based on the solubility of different species in a solvent and can then be separated based on their boiling point. As a third specific example, the oxygenated hydrocarbons can be separated based on their boiling point and can then be separated based on their polarity. As a fourth specific example, the oxygenated hydrocarbons can be separated based on the boiling point of esters derived from the oxygenated hydrocarbons and can then be separated based on their polarity (of either the ester or the hydrolyzed product derived therefrom).

The fatty acids can be separated from other oxygenated hydrocarbons using saponification (and acidulation), fatty acid esterification (FAE) fractionation (such as fatty acid methyl esterification, fatty acid ethyl esterification, fatty acid propyl esterification, fatty acid butyl esterification, etc.), solvent extraction, sorbents (e.g., adsorbents, absorbents), crystallization or cocrystallization (e.g., urea complexation, urea extraction crystallization, thiourea extraction crystallization, selenourea extraction crystallization, biuret extraction crystallization, triuret extraction crystallization, etc.), chromatography, distillation, centrifugation (e.g., analytical ultracentrifugation, density gradient centrifugation, etc.), thermal treatment, combinations thereof, and/or using any separation technique.

In variants using saponification, saponification can be performed, for instance, by mixing the oxidized hydrocarbons with a base (e.g., alkali metal hydroxide, alkaline earth metal hydroxide, alkali metal, etc.). In these variants, the carboxylic acids can be deprotonated and phase separated into an aqueous phase while other oxygenated species can remain in a nonpolar or organic phase. The saponification can be performed at an elevated temperature (e.g., between about 30-200° C. such as 50° C., 75° C., 100° C., 120° C., 150° C., 180° C., etc.), at or near room temperature (e.g., 0° C.-30° C.), and/or at any suitable temperature (e.g., >120° C., <0° C.). The saponification can be performed at an elevated pressure (e.g., above standard atmospheric pressure such as 1.5 bar, 2 bar, 2.5 bar, 2 bar, 5 bar, 7.5 bar, 10 bar, 12 bar, 15 bar, 18 bar, 20 bar, 25 bar, etc.), which can be beneficial to avoid phase separation and/or to enable the process to occur at an elevated temperature (e.g., above a boiling temperature at standard pressure). After separating the carboxylic acid from other species, the carboxylic acid can be recovered, for instance, by acidulation (e.g., acidifying the carboxylates with an acid such as sulfuric acid, nitric acid, hydrochloric acid, hydrobromic acid, hydroiodic acid, etc.). While saponification can be an efficient separation method, saponification typically results in the consumption of materials (e.g., a base to saponify the oxygenated hydrocarbons and an acid to acidulate the soaps).

In variants using fatty acid esterification fractionation, FAE fractionation can be performed, for instance, by reacting the oxygenated hydrocarbons with an alcohol (e.g., methanol for FAME, ethanol for FAEE, propanol, butanol, polyols, etc.). FAE fraction methods can provide a technical advantage of having a high carboxylic acid recovery (e.g., >80%, >90%, >95%, >97%, >99%, etc.) with low residual alkanes in the recovered carboxylic acids. The esterification can be acid and/or base catalyzed. The esterification can additionally or alternatively be performed in a fixed-bed reactor, supercritical reactor, ultrasonic reactor and/or other reactor, and/or can be performed in any manner. In these variants, carboxylic acids of the oxygenated hydrocarbons react with the alcohol to form an ester. The ester (e.g., FAME, FAEE, etc.) can then be separated from other nonester components of the sample for instance using nanofiltration membranes (e.g., epoxy nanofiltration membranes), chromatography (e.g., gas chromatography, thin layer chromatography, etc.), solvent extraction, distillation, evaporation, and/or in any suitable manner. After separating the esters from the other oxygenated hydrocarbons, the esters can be converted to carboxylic acids (e.g., fatty acids) by hydrogenation (e.g., acid catalyzed hydrogenation, base catalyzed hydrogenation, etc.) and/or in any manner.

In variants using solvent extraction, the carboxylic acids (and/or derivatives thereof such as carboxylates, protected carboxylic acids, etc.) can be extracted and/or the other oxygenated hydrocarbons can be extracted (e.g., leaving the desired carboxylic acids behind). The extraction solvent can be a polar protic solvent (e.g., ammonia, butanol, propanol, ethanol, methanol, formic acid, acetic acid, water, etc.), polar aprotic solvent (e.g., dichloromethane, tetrahydrofuran, ethyl acetate, acetone, N,N-dimethylformamide, acetonitrile, dimethyl sulfoxide, etc.), nonpolar solvents (e.g., pentane, hexane, cyclohexane, benzene, toluene, chloroform, carbon tetrachloride, diethylether, etc.), combinations thereof, and/or any suitable solvent(s). In some variations, a plurality of solvents and/or solvent mixtures can be used sequentially to extract different components and/or improve the purity of the carboxylic acids to be recovered. In a specific example, methanol and/or ethanol can be used to extract the carboxylic acids (e.g., from a solid and/or liquid oxygenated hydrocarbon sample). The carboxylic acids can be separated in a Soxhlet extractor, using maceration, and/or using any suitable technique or reactor.

In variants using crystallization, the carboxylic acids (e.g., monocarboxylic acids) can be separated from other oxygenated hydrocarbons by forming carboxylic acid crystals. Typically, crystals can only be formed using relatively narrow fractions (therefore crystallization is most often, most efficient, etc. when performed after S200). However, crystals can be formed from larger cuts. Crystallization can be particularly, but not exclusively, beneficial for removing residual branching and/or unsaturated carboxylic acids from saturated carboxylic acids. The yield and/or purity of the crystallized carboxylic acids can, in some variations, be further enhanced by using cocrystallizing agents such as urea, thiourea, biuret, selenourea, and/or derivatives thereof (e.g., carbamides, thiocarbamides, selenocarbamides, etc. containing one or more alkyl, cycloalkyl, etc. chains for instance with a chain length shorter than, comparable to, longer than, etc. the carbon chain length for a given fraction). The carboxylic acids can be crystallized, for instance, using cooling, evaporation, addition of an antisolvent (e.g., a solvent that the carboxylic acids have low solubility in), solvent layering, sublimation, cation exchange, vapor diffusion, and/or other suitable processes. In some variations, derivatives of the fatty acids (e.g., fatty acid esters, soaps, etc.) could be crystalized (rather than the carboxylic acids themselves).

In variants using thermal treatment, the oxygenated hydrocarbons can be heat treated (e.g., heated to a temperature greater than about 200° C. but less than about 400° C. to avoid decarboxylation of fatty acids such as 250° C., 280° C., 300° C., 320° C., 350° C., 360° C., 375° C., 380° C., 395° C., etc.), which can function to dehydrate one or more oxygenated species (e.g., alcohols, hydroxyacids, oxoacids, etc.). The heat treatment can be particularly beneficial for separation of oxygenated species with greater oxidation states than carboxylic acids (e.g., keto acids, hydroxyacids, etc.) and/or for cyclic esters (e.g., lactones). However, the heat treatment can be beneficial for separating any suitable species. As a first specific example, the thermal treatment can be performed on a mixture of predominantly neutral oxygenated hydrocarbons (e.g., carboxylic acids). As a second specific example, the thermal treatment can be performed on charged oxygenated hydrocarbons (e.g., carboxylates formed during saponification). In variations of the preceding specific examples, the thermal treatment can be performed independently on each fractionated sample. However, the thermal treatment can be performed before fractionation and/or concurrently with fractionation. However, other suitable intermediate(s) can undergo a thermal treatment.

Typically, the dehydration will result in formation of unsaturated bonds in the remaining species. As a specific example, lactones or hydroxyacids can be converted into unsaturated fatty acids. Thus, typically variants of the method that include heat treatment or dehydration will also include hydrogenation of the resulting species (e.g., to convert the unsaturated oxygenated hydrocarbons into saturated oxygenated hydrocarbons with lower oxidation than in the absence of the dehydrogenation reaction). However, additionally or alternatively, hydrogenation can be excluded from variants of the method (where the resulting unsaturated oxygenated hydrocarbons can be separated by other processes such as in S200 or S300, where the resulting unsaturated oxygenated hydrocarbons can remain in the final samples, etc.) and/or hydrogenation can be performed in the absence of dehydrogenation. In variants that include hydrogenation, the hydrogenation is preferably performed to completion (e.g., <1% remaining degrees of unsaturation relative to a starting degree of unsaturation after the hydrogenation reaction). However, in some variants, incomplete hydrogenation can be sufficient (e.g., >1% remaining degrees of unsaturation relative to a starting degree of unsaturation after the hydrogenation reaction).

Separating the oxygenated hydrocarbons can be performed in a single separation step and/or in a multi-step process (for instance, where each step of the process can target a particular oxygenated species to isolate from the fatty acids and/or carboxylic acids). In some variants, a multi-step process can include a primary separation and a secondary separation (and potentially higher separation terms such as tertiary, quaternary, etc. separations). In a specific example, saponification and/or FAME fractionation can be used as a primary separation and solvent extraction, adsorbents, and/or urea complexation can be used as a secondary separation (e.g., a second separation performed after the primary separation). In some variations, a secondary separation can be beneficial following a FAME (or other FAE) separation to remove overoxidized hydrocarbon species (e.g., lactones, hydroxycarboxylic acids, etc.).

In an illustrative example, as shown for instance in FIG. 3A (where percentages in each fraction can refer to a weight percent, mass percent, volume percent, stoichiometric percent, etc.), using a saponification separation can result in residual paraffins (e.g., alkanes) in the separated carboxylic acid (e.g., acid) sample. In variations that include a solvent extraction (as shown for instance in FIG. 4A), a higher degree of purification (e.g., removal of paraffins) can be achieved. For instance, a total weight percent of carboxylic acid (e.g., relative to other oxygenated hydrocarbons and/or paraffin species) after a saponification separation can be between about 60-95% and a total weight percent of carboxylic acid (e.g., relative to other oxygenated hydrocarbons and/or paraffin species) after a saponification and solvent extraction separation can be between about 85-95%. However, the weight percent of carboxylic acid can be any suitable amount. Variations of this illustrative example can include a solvent extraction before the saponification process. For instance, a polar solvent extraction (e.g., using water) can be used to separate polar and nonpolar species. In other variations (that can be combined with the preceding variations), a solvent extraction can be performed on the carboxylates and/or after reacidulation. For instance, a nonpolar solvent extraction (e.g., using a hydrocarbon such as pentane, hexane, heptane, etc.) can be used to separate residual paraffins from the oxygenated hydrocarbons.

However, the carboxylic acids can otherwise be separated.

In a specific example, a post fractionation separation can include a polar solvent extraction. In this specific example, carboxylic diacids with carbon chain lengths between about 8 and 14 carbon atoms long can be particularly prevalent (e.g., account for greater than 1%, 2%, 5%, 10%, 15%, etc.) of carboxylic monoacid fractions with chain lengths between about 12 and 20 carbon atoms. However, any carboxylic diacid can be present in any carboxylic acid fraction (and thereby be separated out). In this specific example, a formic acid separation can be used to separate the carboxylic diacids from the carboxylic monoacids (e.g., free fatty acids). The formic acid concentration (e.g., formic acid concentration by mass, volume, stoichiometry, etc.) in a formic acid solution (e.g., a solution or mixture of formic acid and water) is preferably approximately 90% (e.g., 85-95%) as this concentration can result in preferred separation of the carboxylic diacids from the carboxylic monoacids with the greatest yield. However, different formic acid concentrations can be used (e.g., to improve separation while resulting in reduced yield, to improve yield at a reduced separation efficacy, etc. such as 1%, 5%, 10%, 25%, 50%, 75%, 80%, 90%, 95%, 97%, 99%, 99.9%, 99.95%, values or ranges therebetween, etc.). In variations of this specific example, other solvents can additionally or alternatively be used (e.g., to form solvent systems with formic acid, in place of formic acid, etc.) such as acetic acid, ethylene glycol, formamide, acetonitrile, benzyl alcohol, acetone, formaldehyde, N,N-dimethyl formamide, nitroethane, 2-methoxyethanol, ethyl acetate, methyl acetate, methyl formate, ethyl formate, and/or using any suitable solvent (e.g., a solvent with a polarity index greater than about 5) where the concentration can depend on the solvent(s).

In a second specific example, a post-fractionation separation can include a FAME (fatty acid methyl ester) extraction, where each fraction can undergo a separate FAME extraction. In some variations, only a subset of the fractions can be separated by the FAME extraction (e.g., only fractions that will be included in a formulation can be separated, only fractions with greater than a threshold concentration of species or a specific species to be separated from the carboxylic acids, etc.). In some variations, different esters can be used (e.g., fatty acid ethyl ester, fatty acid propyl ester, etc.). The esters (e.g., FAMEs in the second specific example, but any FAE in general) can optionally be hydrolyzed into carboxylic acids (e.g., free fatty acids).

In a third specific example, a post-fractionation separation can include a crystallizing of the carboxylic acids, where each fraction can undergo a crystallization. In some variations, only a subset of the fractions can be separated by the crystallization (e.g., only fractions that will be included in a formulation can be separated, only fractions with greater than a threshold concentration of species or a specific species to be separated from the carboxylic acids, etc.).

However, any suitable separations can be performed before or after fractioning the oxygenated hydrocarbons.

Esterifying the oxygenated hydrocarbons S400 preferably functions to form glycerides, but can additionally or alternatively form any suitable esters of the oxygenated hydrocarbons. Fatty acids (e.g., carboxylic acids) are preferably esterified. However, additionally or alternatively, alcohols and/or any suitable oxygenated hydrocarbons (e.g., ketoacids, hydroxyacids, lactones, fatty acid ester, glyceride, fatty acid methyl ester, fatty acid ethyl ester, etc.) can be esterified. The glycerides are preferably triglycerides, but can additionally or alternatively be (or include) di-glycerides (e.g., 1,2-diglycerides, 1,3-diglycerides) and/or monoglycerides (e.g., 1-monoglycerides, 2-monoglycerides). The polyglycerides (e.g., diglycerides, triglycerides) can be homoglycerides (e.g., include a plurality of the same fatty acid moiety, homotriglycerides, homodiglycerides, etc.) or heteroglycerides (e.g., include two or three different fatty acid moieties, heterotriglycerides, etc.). For instance, the glycerides can include a stochastic distribution of glycerides formed by mixing different carboxylic acid fractions in known ratios.

One or more carboxylic acid fractions can be esterified together. When multiple fractions are esterified together, the different carboxylic acid fractions can be coesterified (e.g., a first fatty acid fraction and a second fatty acid fraction can be combined and the resulting combination can undergo an esterification reaction), the different carboxylic acid fractions can be interesterified (e.g., each fraction can be esterified separately, the resulting esters can be mixed, and the resulting esters can undergo interesterification), and/or the carboxylic acid fractions can otherwise be esterified (e.g., a combination of coesterification and interesterification can be used).

In variants when more than one fraction is esterified together, interesterification can be used (e.g., each fraction can independently be esterified with glycerol and each of those glyceride fractions can be interesterified). Before interesterification, the esters (e.g., esters associated with each of the fractions to be interesterified) are preferably deodorized (e.g., as described in S500, in a different manner, etc.). Despite adding additional steps to the processing (e.g., adding at least one additional purification step for each ester compared with coesterification), the resulting process can be cleaner (e.g., lower energy, lower carbon impact, etc.) than coesterification. However, additionally or alternatively, coesterification (e.g., mixing the fatty acid fractions together, with glycerol, and forming esters) can be cleaner than interesterification (e.g., because the fractions were cleaner after oxidation in S100, separation in S300, fractionation in S200, etc.; because fewer samples need to be treated; etc.).

In variants where more than one fraction is esterified together, the fractions can be separated by one or more intermediary fraction that is not included in the esterification. As an illustrative example, a C8 and C9 fraction can be esterified with a C12 and C13 fraction, a C14 and C15 fraction, a C16 and C17 fraction, a C18 and C19 fraction, a C20 and C21 fraction, a C22 and C23 fraction, and/or another shorter or larger chain fraction. However, in some variants, the C8 and C9 fraction can be esterified with a C10 and C11 fraction (e.g., with esters that exclude a C12 and C13 fraction but include another longer chain fraction, in esters that do not include a separation of intermediary fractions, etc.). Any number of intermediary fractions can be excluded (e.g., 1 fraction, 2 fractions, 3 fractions, 5 fractions, etc.).

The fatty acids can be esterified (e.g., coesterified, interesterified, etc.) using Fischer esterification (e.g., treating the carboxylate with an alcohol in the presence of a dehydrating agent preferably in acidic conditions), base catalyzed esterification (e.g., forming a mixture of free fatty acids or fatty acid esters and glycerol in basic conditions), Steglich esterification, Mitsunobu reaction, using epoxides, using alcoholysis (e.g., converting the fatty acid to an acyl halide or acid anhydride which is reacted with an alcohol), alkylation of carboxylate anions (e.g., reacting carboxylates of the fatty acid such as generated using a base with an alkyl halide), using the Tishchenko reaction (e.g., to convert recovered aldehydes into esters), interesterifcation (e.g., between glycerides of different fatty acids, between esters of different fatty acids, etc.), and/or using any suitable methods. The esterification can be acid catalyzed, base catalyzed, uncatalyzed, and/or catalyzed in any manner.

In some variants, multiple ester samples can be formed. For example, a first ester sample can be formed by esterifying fractions i and k (e.g., excluding intermediate fraction(s) j) and a second ester sample can be formed by esterifying fractions j and m. In another illustrative example, a first ester sample can be formed by esterifying fractions i and k and a second ester sample can be formed by esterifying fractions i and m. However, any suitable fraction(s) can be used to form one or more ester samples.

Fractions that are not used in forming an ester sample can be retained (e.g., to be used in a subsequent batch to form esters), used in other processes, provided as a potential carbon feedstock (e.g., to be reduced, converted into a paraffin, etc.), can have their chain length modified (e.g., reduce or increase a chain length so that the fraction aligns to another fraction's chain length), and/or can otherwise be used and/or discarded.

Deodorizing the esters S500 preferably functions to purify the esters such as to remove residual free fatty acids, residual oxygenated hydrocarbons (e.g., that were not removed in S200 or S300), odorants, flavorants, and/or other chemical species that can impact a property of the glyceride and/or ester formulation. S500 is typically performed after S400, but could be performed after S200 and/or S300 (e.g., to purify or deodorize the free carboxylic acids, to deodorize fatty acid esters, etc.) and/or with any suitable timing. In addition to or as alternatives to deodorization, the esters (and/or free fatty acids) can be purified using bleaching, sorbents (e.g., absorbents or adsorbents such as silica gel, chalk, acidic soil, basic soil, activated carbon, zeolites, graphite, etc. to sorb impurity or undesirable species), and/or other suitable purification processes.

The ester(s) are preferably deodorized using thermal distillation (e.g., steam distillation, steam stripping, etc.). However, the ester(s) can additionally or alternatively be deodorized using any suitable separation process (e.g., as described in S300), fractionation process (e.g., as described in S200), and/or using any suitable process(es).

In variants of the method, the ester sample can be deodorized more than once. For example, esters from a first fraction (or group of fractions) can be deodorized; interesterified with esters from a second fraction (or second group of fractions), which can also have undergone deodorization independent of the first fraction; and deodorize the interesterified sample. However, deodorization can be performed once and/or any number of times.

An ester recovery (e.g., glyceride recovery such as an amount of ester recovered from the amount of ester input) from the deodorization is preferably greater than about 95%. However, deodorization can result in any suitable ester recovery. The impurity concentration of the ester(s) (e.g., the concentration of other oxygenated species that are not fatty acid esters such as triacylglycerides, diacylglycerides, etc.) after deodorization is preferably less than about 5% (e.g., 0.001%, 0.01%, 0.05%, 0.1%, 0.5%, 1%, 2%, 5%, etc. where the percentage can refer to a weight percentage, mass percentage, volume percentage, stoichiometric percentage, etc.). However, any suitable impurity concentration can remain in the ester(s).

A steam rate for the deodorization can depend on the carboxylic acid fractions associated with the ester, the number of carboxylic acid fractions, the relative fractions (e.g., mixing fractions with greater number of intermediate fractions can lead to greater steam rate), ester mass, ester composition, impurity composition, impurity identity, feed rate, and/or any suitable property(s) of the ester(s). The steam rate can be any value between about 0.1 kg/hr and 10000 kg/hr (e.g., 0.5, 1, 5, 10, 50, 100, 500, 1000, 5000, etc. kg/hr). However, the steam rate can be less than 0.1 kg/hr or greater than 10000 kg/hr. Additionally or alternatively, an intensive feed rate (for example in units of kg steam/kg fat) can be between about 0.001 and 10. In an illustrative example (as shown for instance in FIG. 5), the steam rate for deodorizing a triglyceride sample made of a C8/C9 fraction can be between about 0.6 and 1 kg/hr; the steam rate for deodorizing a triglyceride sample made of a C16/C17 fraction can be between about 300 and 900 kg/hr; and/or the steam rate for deodorizing a triglyceride sample made of a combined C8/C9 and C16/C17 fraction (e.g., coesterified fractions) can be between about 1000 and 3500 kg/hr. In variations of this illustrative example, the steam rate for deodorizing a triglyceride sample made of a C8/C9 mixed with a C16/C17 fraction (e.g., that undergo interesterification) can be between about 300 and 900 kg/hr. However, any suitable steam rate can be used.

A feed rate for the deodorization can depend on the carboxylic acid fractions associated with the ester, the number of carboxylic acid fractions, the relative fractions (e.g., mixing fractions with greater number of intermediate fractions can lead to greater steam rate), ester mass, ester composition, impurity composition, impurity identity, steam rate, and/or any suitable property(s) of the ester(s). The feed rate can be any value between about 1 kg/hr and 10000 kg/hr (e.g., 1, 5, 10, 50, 100, 500, 1000, 5000, 10000, etc. kg/hr). However, the feed rate can be less than 1 kg/hr or greater than 10000 kg/hr. In an illustrative example (as shown for instance in FIG. 5), the feed rate for deodorizing a triglyceride sample made of a C8/C9 fraction can be between about 500 kg/hr; the feed rate for deodorizing a triglyceride sample made of a C16/C17 fraction can be between about 1000 and 1500 kg/hr; and/or the feed rate for deodorizing a triglyceride sample made of a combined C8/C9 and C16/C17 fraction (e.g., coesterified fractions, interesterified esters, etc.) can be between about 1500 and 2000 kg/hr. However, any suitable feed rate can be used.

In some variants, deodorizing the esters can additionally (or alternatively) include one or more purification process. When used in addition to deodorization, these purification process(es) can be performed before, during, and/or after deodorization. Exemplary purification processes include: alkali refining (e.g., neutralization), bleaching (e.g., with activated carbon, with bleaching earth, etc.), novel resins, separation or fractionation processes (e.g., such as those discussed in S200 or S300), and/or any suitable purification process(es) can be performed.

Illustrative Examples

Figure 6:
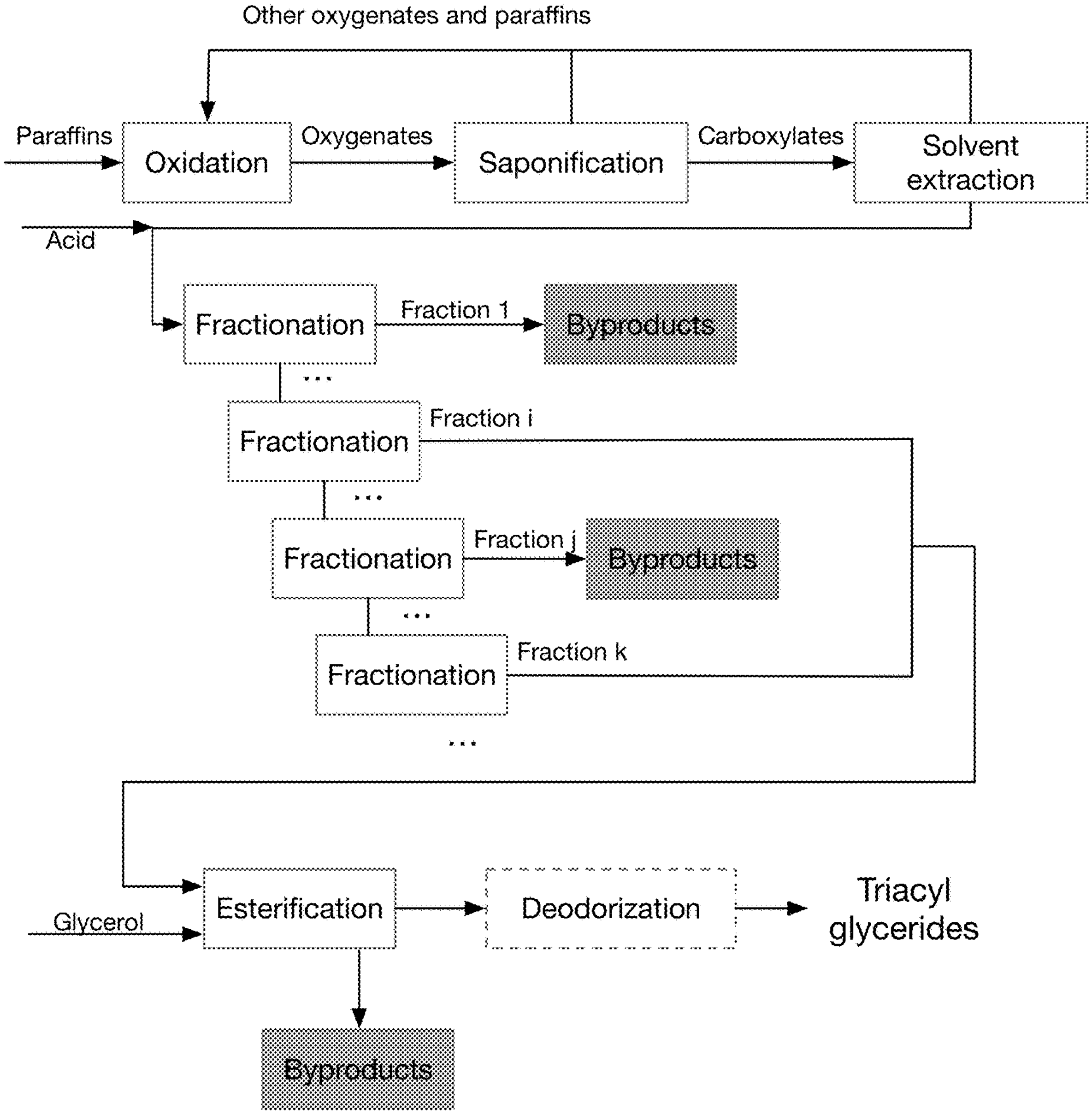
FIG. 6 is a schematic representation of a variant of the method.
Figure 7:
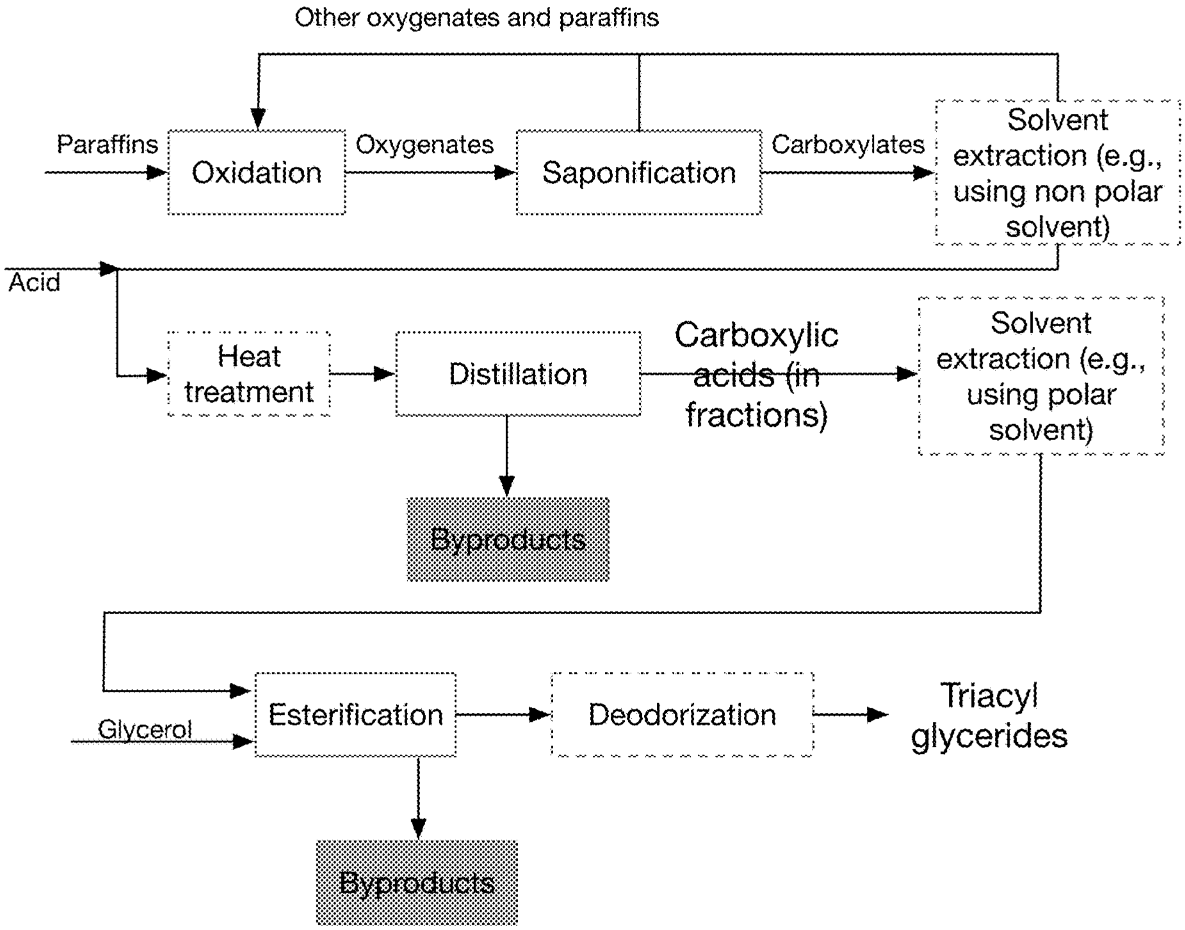
FIG. 7 is a schematic representation of a variant of the method.

In an illustrative example of the method (as shown for instance in FIG. 6), a paraffin sample (primarily unbranched alkanes) and/or hydrocarbon sample (e.g., including up to 30% by mass oxygenates in addition to paraffins) can be oxidized to form oxygenated hydrocarbons, fatty acids (e.g., carboxylic acids) can be separated from (e.g., recovered) the oxygenated hydrocarbons using saponification and optionally solvent extraction (e.g., using ethanol and/or methanol), the fatty acids can be fractionated into pairwise chain lengths of fatty acids (e.g., where the pairs include, consist essentially of, are composed essentially of, contain at least 90% by mass of, etc. an even chain length and a chain length with one carbon more such as C8 and C9 in a single fraction), two or more fractions can be combined (e.g., mixed) and coesterified to form heterogeneous triglycerides, and the triglycerides can be purified by deodorization.

In a second illustrative example of the method (as shown for instance in FIG. 2), a paraffin sample (primarily unbranched alkanes) and/or hydrocarbon sample (e.g., including up to 30% by mass oxygenates in addition to paraffins) can be oxidized to form oxygenated hydrocarbons, fatty acids (e.g., carboxylic acids) can be separated from (e.g., recovered) the oxygenated hydrocarbons using saponification and optionally solvent extraction (e.g., using ethanol and/or methanol), the fatty acids can be fractionated into pairwise chain lengths of fatty acids (e.g., where the pairs include an even chain length and a chain length with one carbon more such as C8 and C9 in a single fraction), two or more fractions can each be esterified to form two or more substantially homogeneous triglycerides (e.g., triglycerides that predominantly have one of two chain length fatty acid moieties), each of the two or more homogeneous triglycerides can be separately deodorized, the two or more substantially homogeneous triglycerides can be combined and interesterified, and the interesterified triglycerides can optionally be purified by deodorization.

In a third illustrative example of the method, a paraffin sample (primarily unbranched alkanes) and/or hydrocarbon sample (e.g., including up to 30% by mass oxygenates in addition to paraffins) can be oxidized to form oxygenated hydrocarbons, fatty acids (e.g., carboxylic acids) can be separated from (e.g., recovered) the oxygenated hydrocarbons using fatty acid methyl ester fractionation (and recovered as fatty acids by acidulation), the fatty acids can be fractionated into pairwise chain lengths of fatty acids (e.g., where the pairs include an even chain length and a chain length with one carbon more such as C8 and C9 in a single fraction), two or more fractions can be combined (e.g., mixed) and coesterified to form heterogeneous triglycerides, and the triglycerides can be purified by deodorization.

In a fourth illustrative example of the method (as shown for instance in FIG. 8), a paraffin sample (primarily, consisting of, consisting essentially of, composed of including only, composed essentially of, etc. unbranched and/or unsaturated alkanes) and/or hydrocarbon sample (e.g., including up to 30% by mass oxygenates in addition to paraffins) can be oxidized to form oxygenated hydrocarbons, the oxygenated hydrocarbons can be fractionated (e.g., via distillation) into a plurality of narrow distributions of oxygenated hydrocarbon chain lengths (e.g., single chain lengths, pairs of chain lengths, trios of chain lengths, etc.), separating the fatty acids (e.g., carboxylic acids) from other oxygenated hydrocarbons independently for each fraction using a solvent extraction (e.g., using formic acid) to separate the fatty acids from other oxygenated hydrocarbons within the respective, forming esters using two or more fractions of the fatty acids, and optionally deodorizing the triglycerides.

In a fifth illustrative example of the method (as shown for instance in FIG. 9), a paraffin sample (primarily, consisting of, consisting essentially of, composed of including only, composed essentially of, etc. unbranched and/or unsaturated alkanes) and/or hydrocarbon sample (e.g., including up to 30% by mass oxygenates in addition to paraffins) can be oxidized to form oxygenated hydrocarbons, the oxygenated hydrocarbons can be fractionated (e.g., via distillation) into a plurality of narrow distributions of oxygenated hydrocarbon chain lengths (e.g., single chain lengths, pairs of chain lengths, trios of chain lengths, etc.), for each fraction using a FAE separation process (e.g., FAME fractionation) to separate the fatty acids (e.g., carboxylic acids) from other oxygenated hydrocarbons within the respective fraction, forming esters using two or more fractions of the fatty acids, and optionally deodorizing the triglycerides.

In a sixth illustrative example of the method (as shown for instance in FIG. 10), a paraffin sample (primarily, consisting of, consisting essentially of, composed of including only, composed essentially of, etc. unbranched and/or unsaturated alkanes) and/or hydrocarbon sample (e.g., including up to 30% by mass oxygenates in addition to paraffins) can be oxidized to form oxygenated hydrocarbons, the oxygenated hydrocarbons can be fractionated (e.g., using distillation) into a plurality of narrow distributions of oxygenated hydrocarbon chain lengths (e.g., single chain lengths, pairs of chain lengths, trios of chain lengths, etc.), for each fraction using crystallization (e.g., optionally including a cocrystallizing agent such as urea) to separate the fatty acids (e.g., carboxylic acids) from other oxygenated hydrocarbons, forming esters using two or more fractions of the fatty acids, and optionally deodorizing the triglycerides.

In a seventh illustrative example of the method (as shown for instance in FIG. 11), a paraffin sample (primarily, consisting of, consisting essentially of, composed of including only, composed essentially of, etc. unbranched and/or unsaturated alkanes) and/or hydrocarbon sample (e.g., including up to 30% by mass oxygenates in addition to paraffins) can be oxidized to form oxygenated hydrocarbons, the oxygenated hydrocarbons can be fractionated (e.g., using distillation) into a plurality of narrow distributions of oxygenated hydrocarbon chain lengths (e.g., single chain lengths, pairs of chain lengths, trios of chain lengths, etc.), for each fraction separating the fatty acids (e.g., carboxylic acids) from other oxygenated hydrocarbons within the respective fraction where different fractions can be separated using different separating processes (e.g., solvent extraction for some fractions and FAME fractionation for other fractions), performing a second separation process on each fraction (independently) such as crystallization (e.g., of carboxylic acids, of esters, etc.), forming esters using two or more fractions of the fatty acids, and optionally deodorizing the triglycerides. In variations of the seventh illustrative example, the additional separation (e.g., crystallization) could be performed on triglycerides.

In an eighth illustrative example, a method for forming a triglyceride sample can include oxidizing hydrocarbons consisting essentially of straight chain hydrocarbons to form oxygenates, thermally treating the oxygenates at a temperature between 300° C. and 380° C. to dehydrate hydroxyacids to unsaturated fatty acids, hydrogenating the unsaturated fatty acids to form saturated fatty acids, fractioning the oxygenates into a plurality of narrow chain distributions of oxygenates, wherein carboxylic acids of each narrow chain distribution of oxygenates comprise at least 90% by mass of a unique pair of carboxylic acids, for each of the plurality of narrow chain distributions of oxygenates, separating carboxylic acids from other oxygenate species using fatty acid methyl ester fractionation to form a respective narrow chain distribution of fatty acids, forming the triglyceride sample by esterifying two or more of the narrow chain distributions of fatty acids together, wherein a hydroxyl number of the triglyceride sample is less than about 20, and deodorizing the triglyceride sample.

In variations of the eighth illustrative example of variations thereof, esterifying the two or more of the narrow chain distribution of fatty acids together comprises interesterifying the fatty acid methyl ester associated with the two or more of the narrow chain distribution of fatty acids.

In variations of the eighth illustrative example or variations thereof, wherein the two or more of the narrow chain distribution of fatty acids are nonsequential narrow chain distributions.

In a ninth illustrative example forming a triglyceride sample comprises fractioning an oxygenate sample into a first narrow oxygenate distribution and a second narrow oxygenate distribution, separating carboxylic acids in the first narrow oxygenate distribution from other oxygenates, independently separating carboxylic acids in the second narrow oxygenate distribution from other oxygenates, esterifying the separated carboxylic acids with glycerol to form the triglyceride sample.

In variations of the ninth illustrative example or variations thereof, separating the fractions comprises fatty acid methyl ester fractionation.

In variations of the ninth illustrative example or variations thereof esterifying the separated carboxylic acids comprises interesterifying the fatty acid methyl esters associated with the first narrow oxygenate distribution with the fatty acid methyl esters associated with the second narrow oxygenate distribution.

In variations of the ninth illustrative example or variations thereof, the method further comprises oxidizing a hydrocarbon sample to form the oxygenate sample.

In variations of the ninth illustrative example or variations thereof the hydrocarbon sample consists essentially of straight-chain hydrocarbons.

In variations of the ninth illustrative example or variations thereof the hydrocarbon sample comprises at most 30% by mass of one or more alcohol, ether, aldehyde, ketone, or acetal.

In variations of the ninth illustrative example or variations thereof, separating the fractions comprises crystallizing the carboxylic acids from the first narrow oxygenate distribution.

In variations of the ninth illustrative example or variations thereof, the method further comprises, dehydrogenating the oxygenate sample to convert hydroxyacids into unsaturated carboxylic acids.

In variations of the ninth illustrative example or variations thereof, the method further comprises hydrogenating the unsaturated carboxylic acids into saturated carboxylic acids.

In variations of the ninth illustrative example or variations thereof, separating further comprises a solvent extraction of the carboxylic acids from the first narrow oxygenate distribution using formic acid.

In variations of the ninth illustrative example or variations thereof, wherein carboxylic acids of the first narrow oxygenate distribution comprise a plurality of carboxylic acids with a first carbon chain length, wherein carboxylic acids of the second narrow oxygenate distribution comprise a plurality of carboxylic acids with a second carbon chain length, wherein the first carbon chain length is different from the second carbon chain length.

In variations of the ninth illustrative example or variations thereof, wherein the carboxylic acids of the first narrow oxygenate distribution comprise at least 90% by mass of the carboxylic acids with the first carbon chain length and carboxylic acids with one more carbon atom than carboxylic acids with the first carbon chain length, wherein carboxylic acids of the second narrow oxygenate distribution comprise at least 90% by mass of the carboxylic acids with the second carbon chain length and carboxylic acids with one more carbon atom than carboxylic acids with the second carbon chain length.

In variations of the ninth illustrative example or variations thereof, wherein the first carbon chain length and the second carbon chain length differ by more than 2.

In variations of the ninth illustrative example or variations thereof, further comprising, saponifying the oxygenate sample to separate carboxylic acids from the oxygenate sample, wherein the carboxylic acids are subsequently fractionated.

In variations of the ninth illustrative example or variations thereof, wherein esterifying the carboxylic acids comprises: esterifying carboxylic acids from the first fraction to form a first triglyceride mixture; esterifying carboxylic acids from the second fraction to form a second triglyceride mixture; separately deodorizing the first triglyceride mixture and the second triglyceride mixture; and interesterifying the first triglyceride mixture and the second triglyceride mixture.

In variations of the ninth illustrative example or variations thereof, wherein alcohols, ketones, or aldehydes separated during fractionation or separation processes are oxidized to form a second oxygenate sample.

In variations of the ninth illustrative example or variations thereof comprising deodorizing the triglyceride sample.

In variations of the ninth illustrative example or variations thereof, the carboxylic acids can consist essentially of straight-chain, saturated carboxylic acids.

In a tenth illustrative example a method comprises performing a first separation process on an oxygenate mixture, performing a second separation process on the separated species from the first separation process wherein the second separation process is orthogonal to or nearly orthogonal (e.g., relies on different physical or chemical properties of the oxygenates) to the first separation process, and optionally esterifying the separated carboxylic acids with glycerol to form a triglyceride sample.

In variations of the tenth illustrative example or variations thereof, wherein the first separation process or the second separation process each comprise one of fractional distillation, FAME fractionation, FAE fractionation, crystallization, urea-assisted crystallization, solvent extraction (e.g., polar solvent extraction, nonpolar solvent extraction, etc. such as formic acid extraction), or saponification.

In variations of the tenth illustrative example or variations thereof, the method can include any suitable variations associated with the eighth or ninth illustrative examples.

In an eleventh illustrative example, a fat formulation can include any suitable fatty acid and/or triglyceride mixture as formed in the first through tenth illustrative examples and/or variations thereof.

However, the method can include any suitable steps in any suitable order.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for forming a triglyceride sample comprising:

a) receiving a hydrocarbon sample formed from an inorganic carbon feedstock;

b) oxidizing the hydrocarbon sample to form an oxygenate sample;

c) fractioning the oxygenate sample into a first narrow oxygenate distribution and a second narrow oxygenate distribution;

d) separating carboxylic acids in the first narrow oxygenate distribution from other oxygenates;

e) independent of d separating carboxylic acids in the second narrow oxygenate distribution from other oxygenates; and f) esterifying the carboxylic acids from d and e with glycerol to form the triglyceride sample.

2. The method of claim 1, wherein d and e) each comprise fatty acid methyl ester fractionation.

3. The method of claim 2, wherein f comprises interesterifying the fatty acid methyl esters associated with the first narrow oxygenate distribution with the fatty acid methyl esters associated with the second narrow oxygenate distribution.

4. The method of claim 1, wherein the hydrocarbon sample consists essentially of straight-chain hydrocarbons.

5. The method of claim 1, wherein the hydrocarbon sample comprises at most 30% by mass of one or more alcohol, ether, aldehyde, ketone, or acetal.

6. The method of claim 1, wherein d comprises crystallizing the carboxylic acids from the first narrow oxygenate distribution.

7. The method of claim 1, wherein the oxygenate sample comprises hydroxyacids, the method further comprising, before c, dehydrating the oxygenate sample to convert the hydroxyacids into unsaturated carboxylic acids.

8. The method of claim 7, further comprising hydrogenating the unsaturated carboxylic acids into saturated carboxylic acids.

9. The method of claim 1, wherein d further comprises a solvent extraction of the carboxylic acids from the first narrow oxygenate distribution using formic acid.

10. The method of claim 1, wherein carboxylic acids of the first narrow oxygenate distribution comprise a plurality of carboxylic acids with a first carbon chain length, wherein carboxylic acids of the second narrow oxygenate distribution comprise a plurality of carboxylic acids with a second carbon chain length, wherein the first carbon chain length is different from the second carbon chain length.

11. The method of claim 10, wherein the carboxylic acids of the first narrow oxygenate distribution comprise at least 90% by mass of the carboxylic acids with the first carbon chain length and carboxylic acids with one more carbon atom than carboxylic acids with the first carbon chain length, wherein carboxylic acids of the second narrow oxygenate distribution comprise at least 90% by mass of the carboxylic acids with the second carbon chain length and carboxylic acids with one more carbon atom than carboxylic acids with the second carbon chain length.

12. The method of claim 10, wherein the first carbon chain length and the second carbon chain length differ by more than 2.

13. The method of claim 1, further comprising, prior to c, saponifying the oxygenate sample to separate carboxylic acids from the oxygenate sample, wherein the carboxylic acids are subsequently fractionated in c.

14. The method of claim 1, wherein esterifying d and e comprises:

esterifying carboxylic acids from d to form a first triglyceride mixture;

esterifying carboxylic acids from e to form a second triglyceride mixture;

deodorizing the first triglyceride mixture and the second triglyceride mixture; and interesterifying the first triglyceride mixture and the second triglyceride mixture.

15. The method of claim 1, wherein the other oxygenates from d) or e) comprise alcohols, ketones, or aldehydes, wherein the other oxygenates are oxidized to form a second oxygenate sample.

16. The method of claim 1, further comprising deodorizing the triglyceride sample.

17. The method of claim 1, wherein the carboxylic acids of step d and e consist essentially of straight-chain, saturated carboxylic acids.

18. The method of claim 1, wherein the hydrocarbon sample is formed from the inorganic carbon feedstock via Fischer-Tropsch synthesis, wherein the inorganic carbon feedstock comprises at least one of carbon monoxide or carbon dioxide.

* * * * *